United States Patent
Tietz

(10) Patent No.: US 12,131,205 B2
(45) Date of Patent: *Oct. 29, 2024

(54) AUTOMATICALLY OPTIMIZED CREDIT POOL MECHANISM BASED ON NUMBER OF VIRTUAL CHANNELS AND ROUND TRIP PATH DELAY

(71) Applicant: Hewlett Packard Enterprise Development LP, Spring, TX (US)

(72) Inventor: Joseph G. Tietz, Fort Collins, CO (US)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/458,304

(22) Filed: Aug. 30, 2023

(65) Prior Publication Data

US 2023/0401117 A1 Dec. 14, 2023

Related U.S. Application Data

(63) Continuation of application No. 17/003,941, filed on Aug. 26, 2020, now Pat. No. 11,762,718.

(51) Int. Cl.
G06F 9/54 (2006.01)

(52) U.S. Cl.
CPC .................... G06F 9/546 (2013.01)

(58) Field of Classification Search
CPC ....... G06Q 20/34; G06F 9/54; G06F 13/1652; G06F 13/4022; G06F 13/4031
See application file for complete search history.

(56) References Cited

U.S. PATENT DOCUMENTS

| 10,257,117 B2 * | 4/2019 | Kumar ................. H04L 49/252 |
| 2014/0237156 A1 * | 8/2014 | Regula ............... G06F 13/4022 710/314 |
| 2015/0222533 A1 * | 8/2015 | Birrittella ............ H04L 5/0055 370/392 |

* cited by examiner

*Primary Examiner* — Iqbal Zaidi
(74) *Attorney, Agent, or Firm* — Yao Legal Services, Inc.

(57) ABSTRACT

Systems and methods are provided for managing data transmissions in integrated circuits using a handshake, credit path, and data path. For example, the handshake between transmission and receiving sides can enable information to be passed over a separate path from the data path. Based on a calculated round trip delay, the system can identify the number of top level flops or registers needed in the credit path, which can be the same as the number of top level flops or registers in the data path. The receiving side can calculate the required number of credits per requested virtual channel based on the available queuing resources of the receiving side and the round trip delay of the data path, in order to ensure full bandwidth data streaming on the channel.

20 Claims, 9 Drawing Sheets

AUTOMATICALLY OPTIMIZED CREDIT POOL MECHANISM BASED ON NUMBER OF VIRTUAL CHANNELS AND ROUND TRIP PATH DELAY

CROSS-REFERENCE TO RELATED APPLICATIONS

This application is a continuation application of and claims priority to application Ser. No. 17/003,941, filed on Aug. 26, 2020, the contents of which are hereby incorporated by reference in their entireties.

DESCRIPTION OF RELATED ART

High-performance computer ("HPC") systems typically include many processors, each with its own local memory. At least some pairs of the processors are interconnected via links to enable each processor to access memory ("non-local memory") of each, or at least some, of the other processors. Some such systems are constructed according to non-uniform memory access ("NUMA") designs, in which access to non-local memory is slower than access to local memory. Because a HPC system may not include a separate link between every pair of processors, some non-local memory accesses are routed through third processors, thereby traversing multi-hop routes. However, determining routes quickly for each non-local memory access poses problems. Furthermore, congested links or routes slow non-local memory accesses, thereby negatively impacting performance of the affected processor(s).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
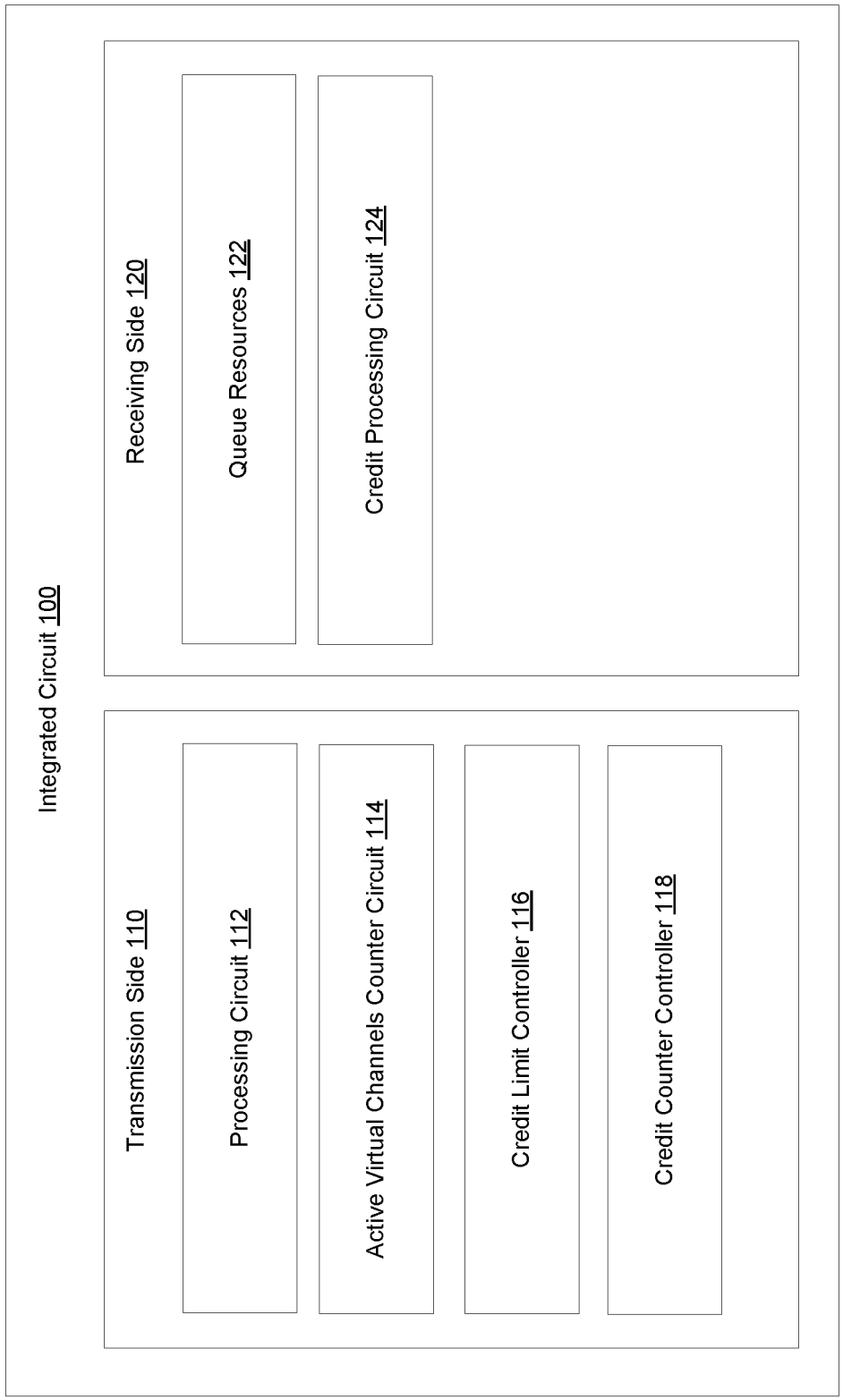
FIG. 1 provides illustrations of differences between two types of systems, in accordance with embodiments of the application.

The figures are not exhaustive and do not limit the present disclosure to the precise form disclosed.

DETAILED DESCRIPTION

High-performance computer ("HPC") systems can provide multiple routes to access shared resources (e.g., bandwidth on a destination communication channel, buffers in a destination memory, etc.), which can decrease congestion for links or routes to non-local memory accesses. These routes typically use "virtual channels" or "VCs." Virtual channels can be separate channels on an integrated chip that includes at least a transmission side (used interchangeably with "TX side") and a receiving side (used interchangeably with "RX side") of the chip. The receiving side of an integrated circuit can include multiple logical channels over a single physical channel (e.g., different virtual channels for different packet types or data streams) to the transmission side. In some examples, there can be multiple logical channels supported by multiple/separate physical channels, or in some examples, there may be a single physical channel that supports multiple logical channels. Thus, for example, multiple source receivers can access shared resources at the receiving side over separate physical or virtual channels, or a single source can access shared resources at the receiving side using multiple virtual channels over a single physical channel.

One way to divide access among the multiple virtual channels is to use a credit-based system in which each virtual channel is allotted a certain amount of credits and the source associated with a particular virtual channel can access the shared resource only when the virtual channel has credits available. Each time a source associated with a particular virtual channel accesses the shared resource, it uses one of the virtual channel's credits, and when the receiving side frees the resource, the credit is returned by the receiving side to the transmission side. When the virtual channel has no available credits, the transmission side generally has to wait for resources to be freed and credits returned by the receiving side.

Some credit-based arbitration schemes include two types of resource pools, namely a dedicated pool for each virtual channel and a shared pool. Moreover, there may be two types of credits, namely dedicated credits and shared credits, that can be allotted to the virtual channels. Credit schemes utilizing dedicated and shared credits often rely on the transmission side of the integrated circuit being fully aware of the various credit streams available at the shared resource of the receiving side. For example, in such credit schemes, the transmission side associated with each virtual channel generally maintains a count of the number of dedicated credits and a count of the number of shared credits available to the virtual channel. The transmission side chooses which type of credit to use for a given receiving side.

Various example embodiments employ a credit-based arbitration scheme in which a dedicated amount of resources for each virtual channel is maintained along with a pool of resources that are shared by and among the various virtual channels. For example, the virtual channels may be assigned a static number of credits of the available credits. This allocation may be made prior to manufacture of the ASIC, so that the virtual channels can have a desired number of credits for each virtual channel. Therefore, it is possible that some channels may not be using all of their assigned credits while another virtual channel is in need of additional credits.

Embodiments described herein can overcome credit resource inefficiencies in integrated circuits, including application specific integrated circuits (ASICs). The channels between the transmission side and the receiving side generally include virtual channels, where each virtual channel can have a respective priority level assigned thereto. Each virtual channel may also be assigned a certain number of credits. In order for the receiving side to accept data over a particular virtual channel, the receiving side may have the number of available credits for that data. In some instances, one or more top level flops or registers may need to be included between the transmission and receiving sides due to the distance between the transmission side and the receiving side. Each additional flop may require additional queueing resources on the receiving side.

This process may help maintain streaming of data without bubbles or gaps in the transmission of data, to create a more efficient data transmission process. For example, the data may be transmitted when there is a credit available. Otherwise, a gap in the streaming data may be formed when the transmission side is waiting for a credit. This gap is more likely to delay the transmission of data than the embodiments that use the credit pool mechanism described herein.

The management of this credit-based system may also introduce a handshake between the transmission and receiving sides to enable information to be passed over a separate path from the data path (i.e., the credit path). During the handshake, a piece of information is sent from the receiving side to the transmission side to the credit path. The transmission side can forward this information over the credit path to the receiving side. Based on this round trip delay, the system can identify the number of top level flops in the credit path, which can be the same as the number of top level flops in the data path.

The receiving side may also receive an indication of the requested virtual channel count of the transmission side. Using this information, the receiving side can calculate the required number of credits per requested virtual channel based on the available queuing resources of the receiving side and the round trip delay of the data path, in order to ensure full bandwidth data streaming on the channel. In addition to the dedicated credits associated with each virtual channel, the receiving side can also optimize use of the shared credits that are available to any virtual channel. In a sample illustration, any dedicated credits that are not used are added to the shared credit pool (e.g., the receiving side has four credits dedicated to each of three virtual channels, but the transmission side only requests two virtual channels so the four credits for the unused virtual channel are added to the shared credit pool, etc.). In this way, the shared credit pool can be increased to enable the would-be dedicated credits to be used. In addition, a shared credit limit can be set such that no one virtual channel can utilize all of the available shared credits in the shared credit pool and create a more efficient system overall. This automated credit optimization scheme may also allow a common RX side implementation to be used in configurations with different TX side requirements, as described herein.

Various embodiments described throughout the disclosure are provided for illustrative purposes only. For example, the integrated circuit described with FIG. 1 is provided as a sample device for implementing the automatically optimized credit pool mechanism based on the number of virtual channels and round trip path delay described herein, but should not be read to limit the disclosure relating to the optimized credit pool mechanism. Additionally, other implementations of the credit pool mechanism may describe, for example, alternate sideband signals than the signals described herein and should not be viewed to limit embodiments that are applicable to implementing the credit pool mechanism.

FIG. 1 illustrates an integrated circuit, in accordance with embodiments of the application. Integrated circuit 100 can comprise transmission side 110 and receiving side 120. Transmission side 110 may comprise processing circuit 112, active virtual channels counter circuit 114, credit limit controller 116, and credit counter controller 118. Receiving side 120 may comprise queue resources 122 and credit processing circuit 124. In some examples, integration circuit 100 may be implemented in hardware as an Application Specific Integrated Circuit (ASIC) or using one or more Field Programmable Gate Arrays (FPGAs).

Receiving side 120 may comprise a plurality of queue resources configured to buffer received data over a data path. The queue resources may comprise a plurality of virtual channel-bound credits and a plurality of shared credits. Transmission side 110 may be connected to receiving side 120 over the data path and a credit path.

Receiving side 120 may reconfigure itself based on the credits available with transmission side 110. The reconfiguration may optimize receiving side 120 to optimize functionality provided by receiving side 120 that is particular to transmission side 110.

Integrated circuit 100 can comprise a control plane. In some examples, the control plane consists of head, tail, and error signals. In some examples, the control plane may be comprised of either three valid signals in order to support three interleaved virtual channels or six valid signals in order to support six interleaved virtual channels. In some examples, routing plane consists of direction and virtual channel switch signals. In some examples, the control plane may also contain some miscellaneous signals including a packet age and credit related signals utilized for clean handshaking during reset and the credit exchange protocol.

Integrated circuit 100 can implement virtual channels. Several system deadlock scenarios may be avoided by separating request and reply traffic onto independent virtual channels (VCs). The system can support separate request and reply VCs and a third VC that is allocated to writebacks. The virtual channels can be interleaved on a clock cycle by clock cycle basis across a common physical channel.

A flit based credit scheme may be supported. This type of credit mechanism can allow receiving side 120 to inform transmission side 110 of available buffer resources on a flit by flit basis. Each buffer location available at receiving side 120 is sized to hold one flit. After reset, receiving side 120 sends back to transmission side 110 the number of available buffer locations (or credits). Transmission side 110 may not be allowed to send a flit if no credits are available on that VC. Each packet on a given virtual channel may start with a head flit and end with a tail flit. In some examples, a single flit packet can contain both head and tail indicators. VC assignments may correspond with VC0—Requests (Virtual Network 0), VC1—Responses (Virtual Network 0), VC2—Writeback (Virtual Network 0), VC3—Requests (Virtual Network 1), VC4—Responses (Virtual Network 1), and VC5—Writeback (Virtual Network 1).

As buffer locations are freed at receiving side 120, additional credits are sent back to transmission side 110. The number of in-flight credits (based on total destination buffer space) should allow for turn-around time of the credits, so that a continuous flow of data, without bubbles, can be maintained. In general, bubbles in the data may reduce the achieved bandwidth during the period where data is not sent due to the lack of credits. The continuous flow of data may be interrupted due to the lack of credits. This may additionally cause no valid data to be sent during a given clock cycle and additional queuing processing to be implemented at receiving side 120 to maintain the data flow.

Credits on a data path are divided between dedicated VC resources and shared VC resources. Dedicated credits for a given VC can only be used by that VC. Shared credits can be used by any VC. Having dedicated credits for each VC ensures that one VC cannot lock out another VC by using up all the credits.

In typical operation, transmission side 110 can utilize any available shared credits first before utilizing the dedicated credit pool for a given VC. As VC credits are returned from receiving side 120, credits for that VC should be assigned to the dedicated VC pool first, and once the dedicated credit pool for that VC is full, any further credits received on that VC should be assigned to the shared credit pool.

Integration circuit 100 may implement a flit with the data exchange. The flit may correspond with a single header or data unit transferred in a one clock cycle to help provide a data integrity mechanism that allows for correcting a single bit error, and detecting double bit errors. Each flit may also carry an "uncorrectable error" indication. This allows a flit containing a source specific uncorrectable error (such as an uncorrectable memory error or header error) to retain the error indication.

Integration circuit 100 may support a direction vector in some implementations. For example, a direction vector can provide routing for the unique source and destination combinations, including both core chiplet ports and NL ports. Once a packet enters a first chiplet, the direction vector may be used to route the packet through the crossbars.

Integrated circuit 100 may support virtual channel switching. For example, integrated circuit 100 may support a virtual channel switch capability to allow the selection of the target virtual network (VN0 or VN1) as the packet is presented to the network. The packet can be switched to the lower virtual network, the upper virtual network, or remain on the same virtual network it arrived on. The encoding may allow for the marking of a node shape error and potentially discarded. This information may be obtained from software configured routing tables contained within transmission side 110.

Transmission side 110 may comprise processing circuit 112, active virtual channels counter circuit 114, credit limit controller 116, and credit counter controller 118. Processing circuit 112 is configured to perform any of the operations performed by transmission side 110. In some examples, processing circuit 112 is communicatively coupled to credit processing circuit 124 of receiving side 120 over the credit path.

Active virtual channels counter circuit 114 is configured to count a number of active virtual channels transmitting data over the data path.

Credit limit controller 116 is configured to compare a number of shared credits assigned to a respective virtual channel against a shared credit limit.

Credit counter controller 118 is configured to count a number of credits in use by each of the virtual channels over the data path.

Receiving side 120 may comprise queue resources 122 and credit processing circuit 124. Queue resources 122 is configured to buffer received data over a data path. The queue resources may comprise a plurality of virtual channel-bound credits and a plurality of shared credits.

In some embodiments, credit-based arbitration may implement in the context of shared memory such as a Dynamically Allocated Memory Queue (DAMQ) buffer. Generally speaking, a DAMQ buffer is a buffer scheme that utilizes a linked list of buffers for each virtual channel so that the overall memory resource can be allocated between virtual channels on the fly. A dedicated buffer pool may be allocated for each virtual channel, and a shared buffer pool may be allocated to be shared among the virtual channels.

The dedicated buffer pools can ensure forward progress for each virtual channel, and the shared buffer pool can allow optimization of overall buffer resources based on active virtual channels.

In some examples, each virtual channel (i.e., VC0-VCm) can be associated with multiple destinations (i.e., Dest 0-Dest n). A linked list may be maintained for each virtual channel or destination. Each linked list can include a head register for storing a head read address and a tail register for storing a tail read address. The head register may point to the first buffer in the queue and the tail register may point to the last buffer in the queue. A next free priority write address generator generates the address for the buffers to be used for storing packets for the virtual channel/destination.

Credit processing circuit 124 is configured to determine a network package age. The determination may give arbitration priority to older packets that have been routing through the network longer. The packet age field can continue to increment or "age" for time spent within network queues along the path from the source to final destination.

The mechanism that generates an age increment signal or involves a signal can function based on network queue and timing of the round trip delay. For example, the transition from an age of 2'b00 to 2'b01 occurs when a packet is waiting in a network queue while bit 0 of the age increment signal is asserted. In another example, the transition from an age of 2'b01 to 2'b10 occurs when a packet is waiting in a network queue while bit 1 of the age increment signal is asserted. In another example, the transition from an age of 2'b10 to 2'b11 occurs when a packet is waiting in a network queue while bit 2 of the age increment signal is asserted. Once the age field advances to 2'b11, further aging may cease and the packet obtains a high priority status. This high priority status may be utilized by subsequent points of arbitration within the network prior to the final destination in order to give the packet favored handling.

Credit processing circuit 124 is also configured to provide various sizes of data channels and data rates. In a sample illustration, credit processing circuit 124 may support a 171-bit multiplexed header/data channel. The channel can support, for example, a unidirectional data rate of 14.72 GB/s at 920 MHz for a 4-flit packet with 64 byte payload (and a bidirectional data rate of 11.78 GB/s for a 5-flit sequence consisting of both request and reply packets with 64 byte payload).

Credit processing circuit 124 is also configured to support a plurality of interleaved virtual channels corresponding to a plurality of virtual networks (VNs).

Credit processing circuit 124 is also configured to support unique head, tail, and error indications on a flit by flit basis.

Credit processing circuit 124 is also configured to support a flit based credit scheme with independent credit signals for the plurality of virtual channels.

Credit processing circuit 124 is also configured to provide transport support. In a sample illustration, credit processing circuit 124 may support a direction vector used for routing packets through the crossbars and provide transport for a virtual channel switch field that is used in selecting the target virtual network (VN0 or VN1) as a packet is routed through the crossbars.

Credit processing circuit 124 is also configured to support the determination of the round trip delay and the "active" VCs. These features can allow an automatic optimization of the credit and queue allocations based on the round trip delay and the actual VCs being utilized on a particular data path.

Figure 2:
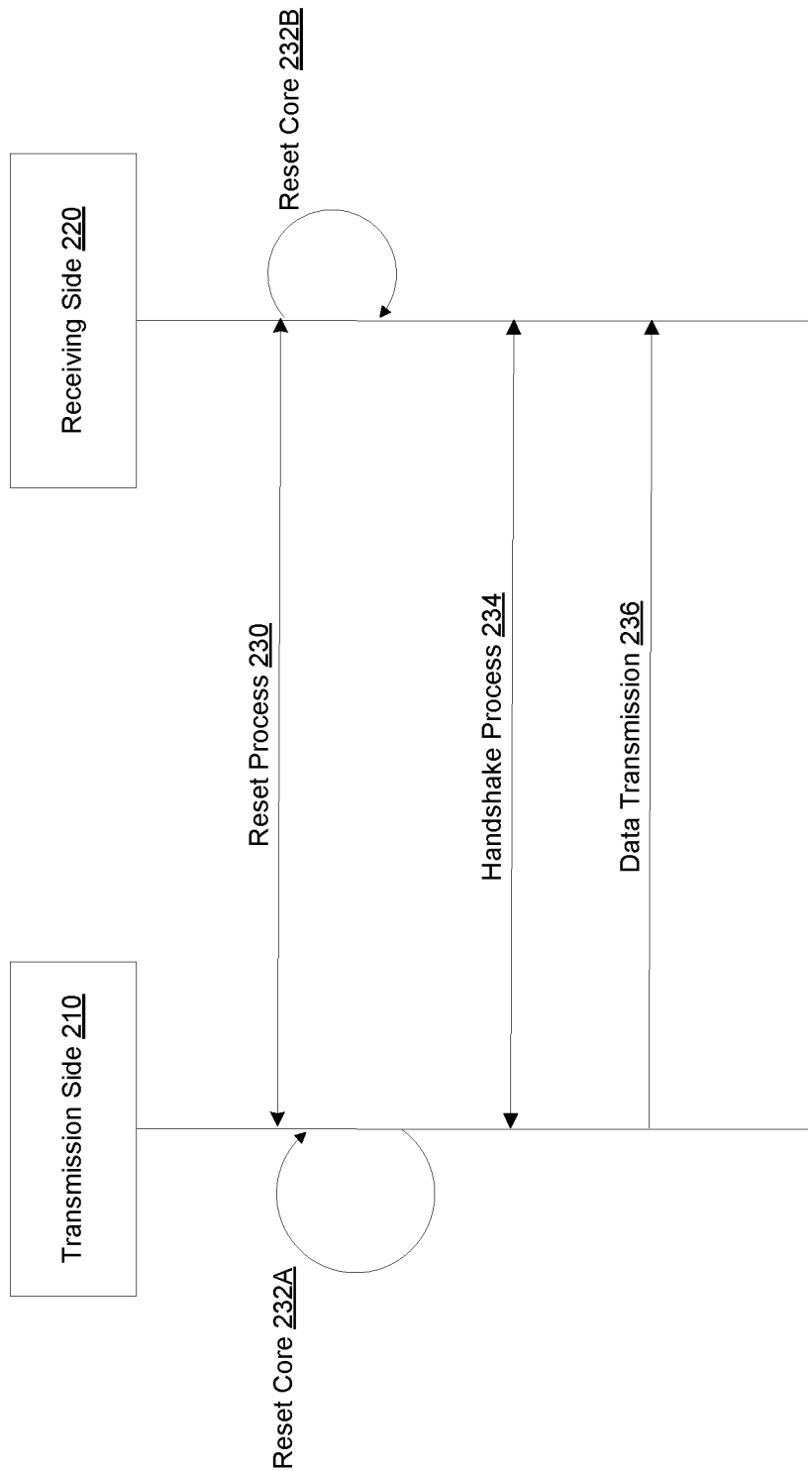
FIG. 2 illustrates a data exchange process that utilizes a credit path and a data path, in accordance with embodiments of the application.

FIG. 2 illustrates a data exchange process that utilizes a credit path and a data path, in accordance with embodiments of the application. The illustration may provide a high level process for performing the credit exchange protocol. Transmission side 210 and receiving side 220 in FIG. 2 may be similar to transmission side 110 and receiving side 120 of FIG. 1.

At block 230, receiving side 220 informs transmission side 210 upon entering a reset event. Transmission side 210 can halt traffic flow, reset credit counters, and wait for the receiving side 220 to initiate a credit exchange protocol.

Transmission side 210 may also inform receiving side 220 upon entering a reset event. Receiving side 220 can wait to receive a negated signal from the source and then initiate the credit exchange protocol.

At block 232, each side resets its core, including transmission side 210 resetting its core at block 232A and receiving side 220 resetting its core at 232B.

Figure 3:
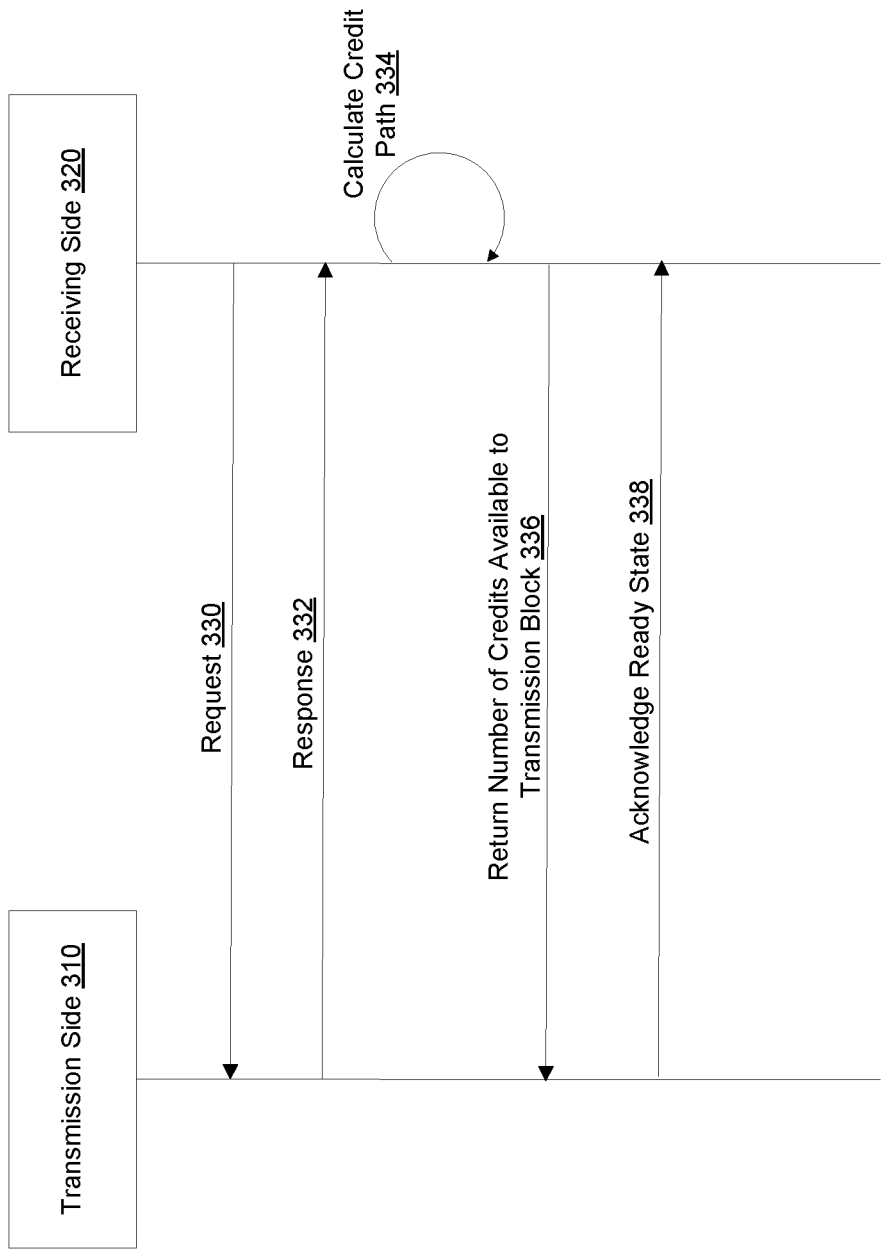
FIG. 3 illustrates a handshake process that utilizes a credit path, in accordance with embodiments of the application.

At block 234, a handshake process is initiated. In some examples, block 232 is included with the handshake process as well. Additional detail on the handshake process is provided with FIG. 3. Transmission side 310 and receiving side 320 in FIG. 3 may be similar to transmission side 110 and receiving side 120 of FIG. 1.

At block 330, a request signal is sent from receiving side 320 to transmission side 310. Receiving side 320 may wait at least 8 clock cycles after the negation of either the negated signal from the source or the negated signal from the destination before sending the request signal to start the credit exchange protocol. Receiving side 320 sends a one clock wide request signal in order to request the "active" VCs from the transmission side 310 and to start the measurement of the round trip delay on this data path.

At block 332, a response signal is sent from transmission side 310 to receiving side 320. Transmission side 310 may receive the request signal and immediately return the response signal to receiving side 320.

After a one clock cycle, the transmission side 310 may send the active VCs (e.g., serially two bits per VC, one bit per clock, starting with bit 0) for the next 12 clock periods starting with VC0 (13 clocks total for the response signal sequence).

The active VC state on transmission side 310 may be obtained from an MMR, TDR, or be hardwired at a top level of the block of logic that implements both the transmission side and the response side instance and may include state that will depend on the currently active VC mode.

At block 334, receiving side 320 may calculate round trip delay based on a timing between the request signal to the response signal round trip delay. Receiving side 320 may also save the active VC state for use during dedicated and shared credit calculation.

At block 336, a credit limit signal is sent from receiving side 320 to transmission side 310. This may correspond with a dynamically calculated number of credits available for transmission side 310 to use during normal processing.

In some examples, receiving side 320 may wait at least 16 clock cycles after observing the response signal before sending credit limit signal. This waiting process may allow for reception of active VC state from transmission side 310. Receiving side 320 may calculate credit limits based on a combination of MMRs and/or active VC state.

Receiving side 320 may send a one clock wide credit limit signal along with the three credit limits starting with a least significant VC. For example, when using virtual channels 0-2, the VC may be included with a first credit signal and when using virtual channels 3-5, the VC may be included with a second credit signal. The credit limits may correspond with in parallel one VC credit limit per clock. The least significant VC may coincide the credit limit signal. After the three VC credit limits are sent, the limit for the shared pool is sent on the fourth clock period and the measured round trip delay may be sent on the fifth clock period on the first credit signal or the second credit signal, which may share the same timing and field content as the first credit signal.

In some examples, the first credit signal carries the individual returning credit counts for each VC, and is divided into three groups of two bits each. The credit counts may be carried in various pre-defined positions of the first signal.

At block 338, transmission side 310 sends a credit limit acknowledgement signal. In some examples, transmission side 310 may wait at least 8 clock cycles after observing credit limit signal asserted before sending the credit limit acknowledgement signal in order to allow for the reception of the full credit limit state from the receiving side 320. The credit limit acknowledgement signal may correspond with a one clock wide signal.

In some examples, receiving side 320 calculates credits per VC (e.g., dedicated and shared) based on round trip delay, active VCs, and the MMRs.

Returning to FIG. 2 at block 236, a data transmission may be initiated. Receiving side 220 may send credits as calculated with FIG. 3 using the first credit signal and the second credit signal (if needed). The new credit state may be sent 1-3 credits per VC per clock cycle in order to equal the calculated number of credits available on each VC. Once transmission side 210 receives credits for a VC with pending data to send, the data flow can start to receiving side 220.

In some examples, the elapsed time from when the request signal is sent until the corresponding response signal is received may not exceed 32 clock cycles or a timeout event can occur. If the response signal is not received in this amount of time, an assumption may be made that the source is in reset or there is a potential logic problem.

In some examples, the elapsed time from when an credit limit signal is sent until the corresponding credit limit acknowledgement signal is received should not exceed 32 clock cycles or a timeout event may occur. If the credit limit acknowledgement signal is not received in this amount of time, an assumption may be made that the source is in reset or there is a potential logic problem.

Figure 4:
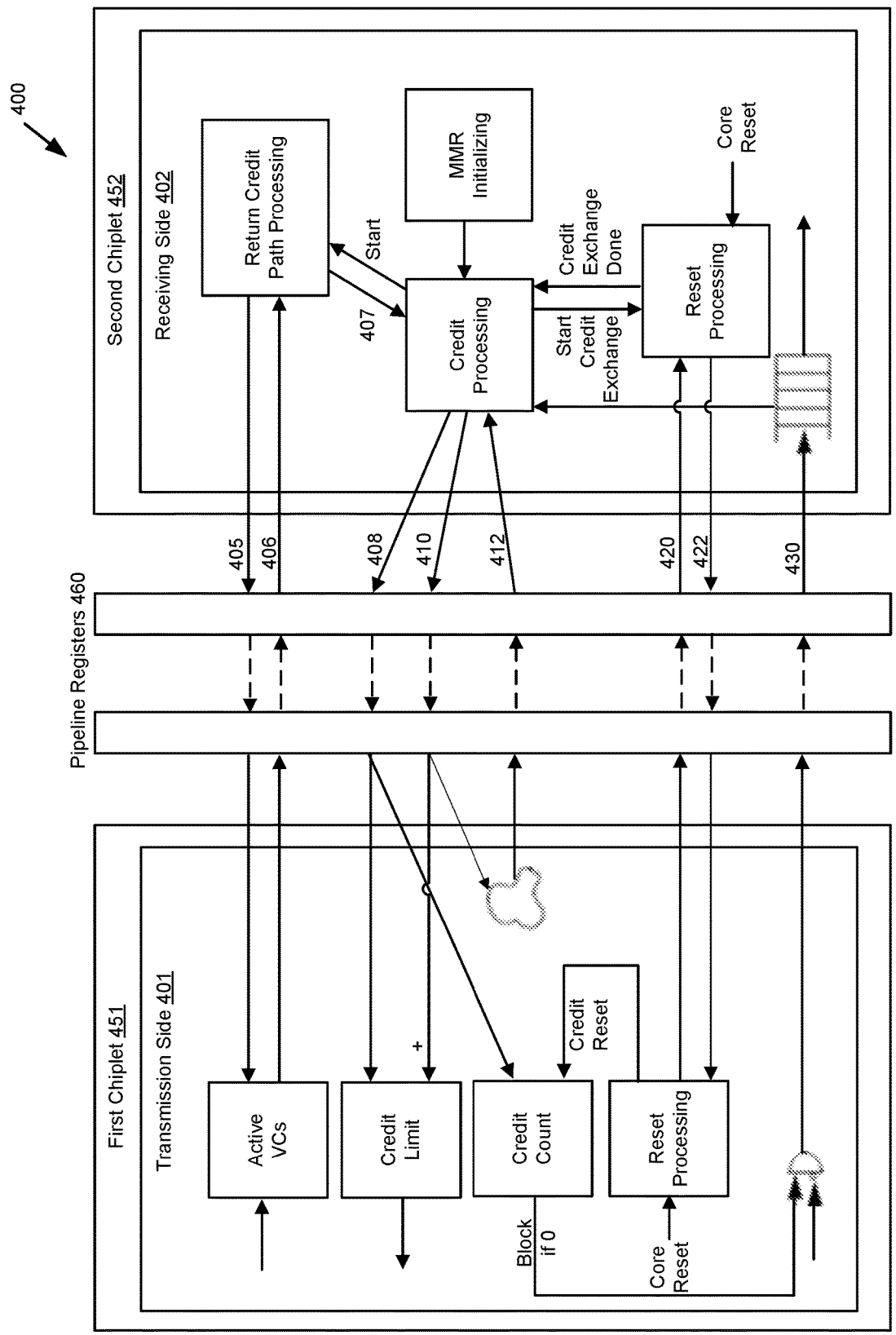
FIG. 4 is an example credit exchange block diagram, in accordance with embodiments of the application.

FIG. 4 is an example credit exchange block diagram, in accordance with embodiments of the application. In some examples, data are exchanged on the data, control, routing, or credit planes within the integrated circuit. In some examples, data may be exchanged in an integrated circuit similar to integrated circuit 100 illustrated in FIG. 1. Additionally, transmission side 401 and receiving side 402 in FIG. 4 may be similar to transmission side 110 and receiving side 120 of FIG. 1.

Credits and data may be exchanged between transmission side 401 and receiving side 402 that passes through top level flops or pipeline registers 460. There may be more or fewer flops stages implemented in other embodiments of the system than which are illustrated in FIG. 4. The top level flops or pipeline registers 460 may represent a plurality of flop stages (e.g., zero, one, more than one, etc.) between transmission side 401 and receiving side 402 interfaces. These flops may represent floorplan block boundaries and/or top level flops added to the ASIC based on the clock rates and distance between transmission side 401 and receiving side 402 interfaces. During the credit handshake process, receiving side 402 queuing may be automatically optimized based on the number of flop stages implemented in the system.

In general, a chiplet may comprise a floorplan block of the ASIC. Transmission side 401 and receiving side 402 may be implemented on different chiplets, including first chiplet 451 and second chiplet 452, respectively. In other examples, a single block of logic may implement both transmission side 401 and receiving side 402 as a common block instantiated in core chiplet blocks in order to support two channels, one for each direction. In either embodiment, the chiplet(s) may implement the credit mechanism as the one block to be used in different configurations on the same application specific integrated circuit (ASIC). For example, the receiving block may be the router or crossbar block that connected to the transmission blocks in each of the core chiplet blocks.

In some examples, each chiplet or tile may contain both an receiving side and a transmission side. The number of top level flops on a given path may be varied based on the distance between a given receiving side and transmission side.

In some examples, receiving side 402 may be a common RTL implementation used in multiple areas of the ASIC while still providing support for different transmission sides, including transmission side 401. The automated credit optimization scheme may allow a common receiving side implementation to be used in configurations with different transmission side requirements (e.g., each transmission side on a different chiplet, etc.).

On the data plane, signals may be exchanged between transmission side 401 and receiving side 402 that comprise various data. A first signal may comprise a multiplexed header/data transmitted from transmission side 401 to receiving side 402. The first signal may carry the multiplexed header and data for the channel. A header signal may be exchanged on the control plane to correspond with the first signal and may be asserted coincident with the packet header in order to signify that this field is carrying a header.

A second signal may comprise an ECC for the multiplexed header/data transmitted from transmission side 401 to receiving side 402.

On the control plane, signals may be exchanged between transmission side 401 and receiving side 402 that comprise various data. A valid VC signal may comprise an identification of which of the three or six, for example, supported virtual channels are associated with. As a sample illustration, the valid VC signal may comprise the number of valid virtual channels (VCs), one for each supported VC. This may comprise the first signal or the second signal on the data plane, or other signals discussed herein. If no valid VC signal is asserted in a given clock cycle, then the other signals described herein may be ignored (e.g., as in an idle cycle). In some examples, only one of the three or six signals can be asserted in any given clock cycle.

The valid VC signal may vary based on the virtual channel assignment. For example, the VN0 virtual channel assignments (VC0-VC2) may implement the valid VC signal for requests, responses, and writebacks, respectively. In another example, the VN1 virtual channel assignments (VC3-VC5) may implement the valid VC signal for requests, responses, and writebacks.

The header signal may comprise a header identifier on the control plane transmitted from transmission side 401 to receiving side 402. This header signal may assert that the current flit is the first flit of a packet and contains a header. In some examples, the flit may comprise a single header or data unit in a one clock cycle.

If the current header represents a dataless packet, the tail signal may also be asserted with the header and transmitted from transmission side 401 to receiving side 402. In some examples, the tail signal may traditionally comprise a tail identifier. The tail signal may assert that the current flit is the last flit of packet. This signal will also be asserted for a dataless header.

Figure 5:
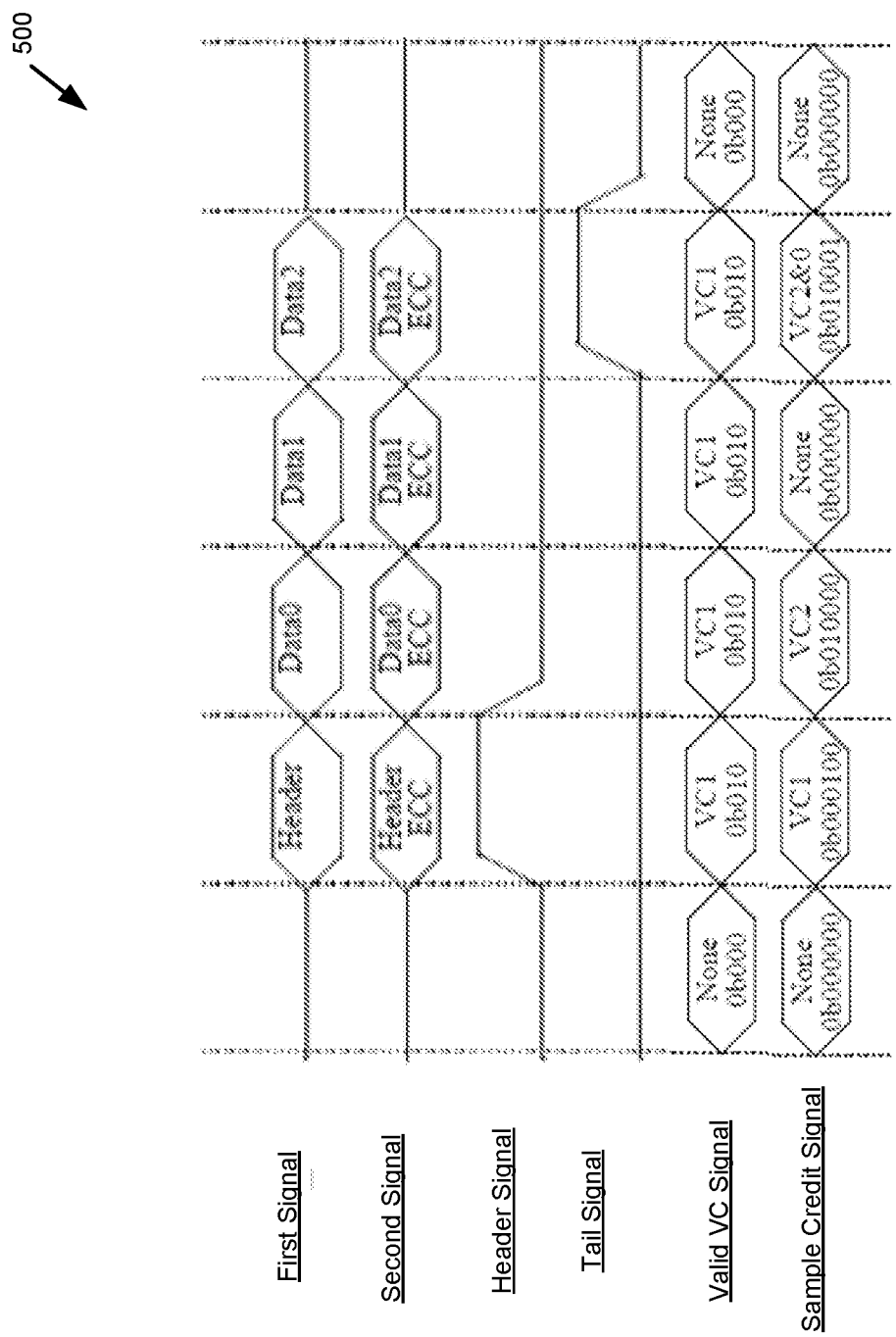
FIG. 5 is an example timing diagram, in accordance with embodiments of the application.

On the credit plane, various data can be exchanged to implement the credit pool between transmission side 401 and receiving side 402, as illustrated in FIG. 5 as "sample credit signal." A first credit signal may be transmitted from receiving side 402 to transmission side 401 as returning credit count for each of the VCs on VN0. The count may be distributed between the VCs on VN0. A second credit signal may be transmitted from receiving side 402 to transmission side 401 as returning credit count for each of the VCs on VN1. The count may be distributed between the VCs on VN1. In some examples, the second credit signal is also used during a credit exchange protocol in order to relay the credit limit values for each VC from receiving side 402 to transmission side 401.

A negated signal from the source may be transmitted from transmission side 401 to receiving side 402 as a reset signal. The signal from transmission side 401 may invoke the reset credit exchange protocol at receiving side 402 (e.g., after a negated edge) in order to re-establish credits if the source side link gets reset. In some examples, the negated signal informs receiving side 402 that transmission side 401 is experiencing a reset event. Receiving side 402 may initiate the credit exchange protocol once a negated edge of a fourth credit signal is observed.

A negated signal from the destination may be transmitted from receiving side 402 to transmission side 401 as a reset signal. The reset from receiving side 402 may inform transmission side 401 that a credit exchange will be starting. This can be used at transmission side 401 to halt further traffic flow until the credits have been re-established. In some examples, the negated signal informs transmission side 401 that receiving side 402 is experiencing a reset event. Receiving side 402 may initiate the credit exchange protocol once the negated edge of the fourth credit signal is observed.

A request signal may be transmitted from receiving side 402 to transmission side 401. The request signal may initiate the credit exchange protocol by requesting the "active" VCs utilized by transmission side 401. The request signal also may represent the first reference point identifying the start of the return credit path.

A response signal may be transmitted from transmission side 401 to receiving side 402 as an acknowledgement signal. The response signal can mark the start of the "active" VC data returning from transmission side 401. This signal may also represent the second reference point identifying the end of the return credit path. The difference between these two reference points in clock cycles may equate to the full return credit path on this path.

A credit limit signal may be transmitted from receiving side 402 to transmission side 401. The credit limit signal may mark the start of the credit limit data being sent from receiving side 402 to transmission side 401 on a particular channel.

In some examples, the credit limit signal is sent by receiving side 402 during the credit exchange protocol in order to mark the start of the handshake where the credit limits are being sent from receiving side 402 to transmission side 401. The credit limit handshake can support a plurality of time slots on each of the first credit signal and second credit signal. For example, the first three time slots can transfer the credit limits for three VCs. The last two time slots transfer the size of the shared pool and the round trip delay. These last two parameters may be used for transmission side 401 management of the shared credit pool.

A credit limit acknowledgement signal may be transmitted from transmission side 401 to receiving side 402. The credit limit acknowledgement signal may acknowledge the reception of the credit limits from receiving side 402 and that all further traffic flow from transmission side 401 has been halted.

In some examples, the credit limit acknowledgement signal is sent by transmission side 401 during the credit exchange protocol in order to acknowledge reception of the credit limits sent by receiving side 402 and to confirm that all further traffic flow from transmission side 401 has been halted until the credits have been re-established.

These signals may be exchanged between transmission side 401 and receiving side 402, as further illustrated in FIG. 4. At block 405, request signal may be transmitted from receiving side 402 to transmission side 401. The request signal may initiate the credit exchange protocol by requesting the "active" VCs utilized by transmission side 401. The request signal also may represent the first reference point identifying the start of the return credit path.

At block 406, credit limit acknowledgement signal may be transmitted from transmission side 401 to receiving side 402.

At block 407, a round trip delay may be calculated. The calculation may be used to identify the number of pipeline registers 460 (e.g., top level flops) in the credit path, which can be the same as the number of pipeline registers 460 in the data path.

At block 408, a first credit signal and/or second credit signal may be transmitted from receiving side 402 to transmission side 401. Each of these credit signals may return credits that can be used during normal processing.

At block 410, a credit limit signal may be transmitted from receiving side 402 to transmission side 401 to inform transmission side 401 of a credit limit that transmission side 401 can use. The credit limit signal can mark the start of the credit limit data being sent from receiving side 402 to transmission side 401 on the particular channel.

At block 412, a credit limit acknowledgement signal may be transmitted from transmission side 401 to receiving side 402 as an acknowledgement of the credit limit signal.

At block 420, the negated signal from the source may be transmitted from transmission side 401 to receiving side 402 as a reset signal.

At block 422, the negated signal from the destination may be transmitted from receiving side 402 to transmission side 401 as a reset signal.

At block 430, the data channel may be established and data may be transmitted from transmission side 401 to receiving side 402. Data may be stored in a queue at receiving side 402. Data may comprise the data, header, tail, an error code, and/or a specification of which virtual channel (VC) is used.

FIG. 5 is an example timing diagram, in accordance with embodiments of the application. The timing diagram may comprise a typical cacheline transfer as described herein. The header signal may identify a first flit as a header, and the tail signal may identify Data2 as the last flit of the packet. This particular example illustrated with FIG. 5 can transfer the packet using VC1.

Figure 6:
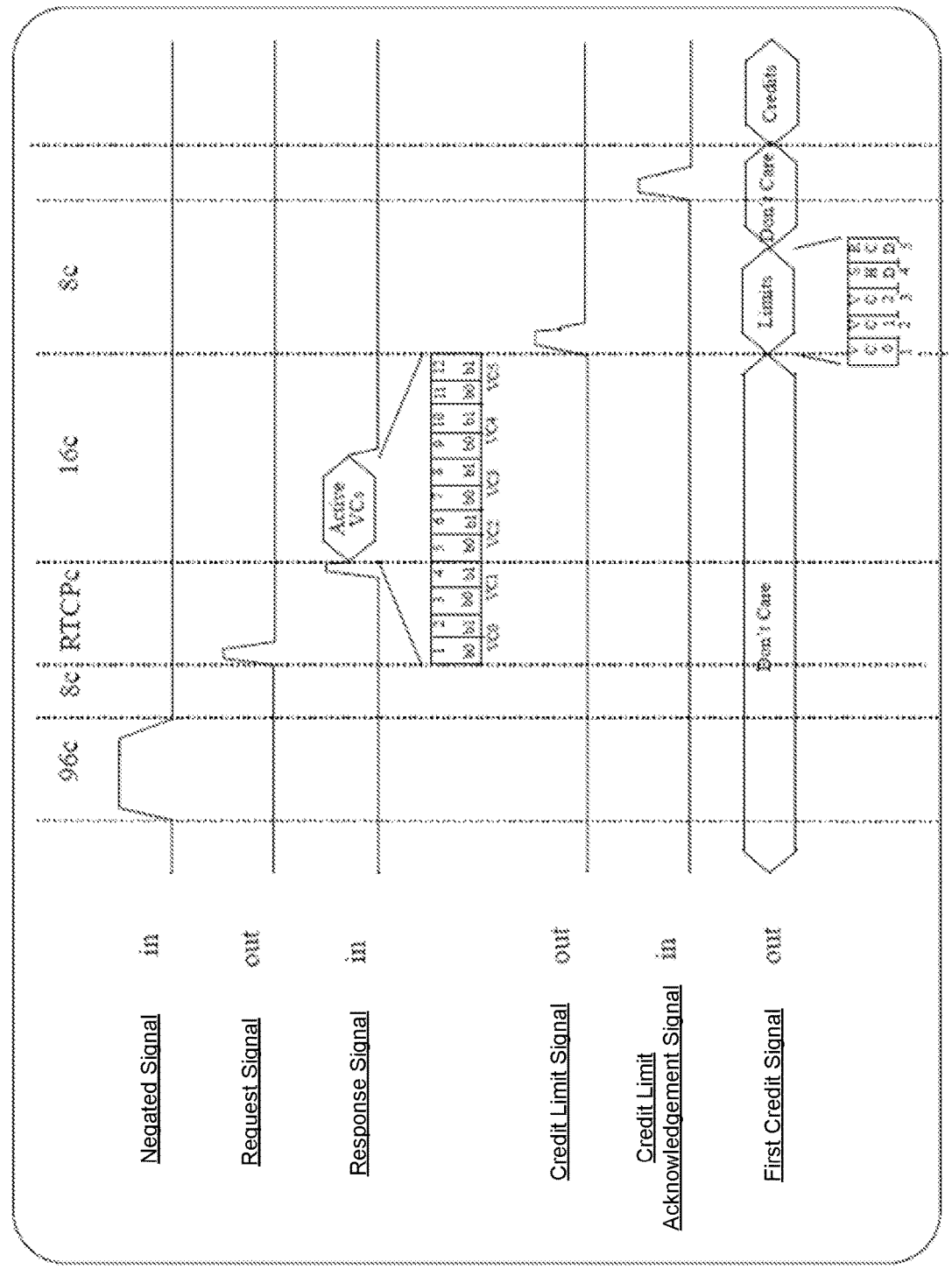
FIG. 6 illustrates a credit exchange timing diagram at a receiving side, in accordance with embodiments of the application.

FIG. 6 illustrates a credit exchange timing diagram at a receiving side, in accordance with embodiments of the application. The illustration contains a sample of a high level timing diagram for the credit exchange protocol. The protocol described herein may support the processing of reset events and has the ability to adjust the credit logic dynamically within an active system.

In some examples, the system may automatically optimize the dedicated and shared credit pool allocations based on the round trip delay on a given path (e.g., determined during the credit exchange protocol) and the active VCs that are currently in use. This active VC state allows the dedicated VC credit allocations for unused VCs to be added to the shared pool.

In some examples, the flow defined by the credit exchange protocol can calculate the round trip delay, exchange the active VC state, exchange the credit limits (for all VCs plus the shared pool and round trip delay), and exchange the available credit values for each VC.

In some examples, the round trip delay is a handshake between the receiving side 120 and transmission side 110 as illustrated in FIG. 1. The round trip delay can provide a measurement of the round trip delay on the credit path. The active VC state information may identify any unused VCs on transmission side 110. The combination of the round trip path delay and active VC information is used to automatically optimize the allocation of dedicated and shared credits based on the round trip delay and actual VCs in use on a given path.

In some examples, the credit limit may inform transmission side 110 of the maximum credit count that should be in use for each VC plus the shared credit pool. If transmission side 110 detects a credit count that exceeds the credit limit on a given VC (or shared credit pool), then a credit overflow error has occurred and a credit overflow error may be reported on that VC or the shared credit pool.

In some examples, the credit value may inform transmission side 110 of the number of available credits on each VC. Note that the instantaneous credit count may be different than the credit limit value on a given VC if data is currently in flight on that VC. This may correspond with the balance of which is currently residing in buffers on receiving side 120 or is in flight between receiving side 120 and transmission side 110.

In some examples, the automatic credit optimization features (using the round trip delay and active VC state) of the credit exchange protocol can be overridden by MMRs for DV purposes. This may allow running with reduced credit allocations (e.g., down to 1 credit per VC) in order to increase the level of stress on the packet flow during diagnostics.

In some examples, a default credit mode that can be selected via an MMR. In some examples, "automatic" credit optimizations can be selected. These options may configure the interface with a minimum number of dedicated credits per VC with the balance made available in the shared pool (e.g., such as 4 dedicated credit per VC with the remaining credits assigned as shared credits).

Figure 7:
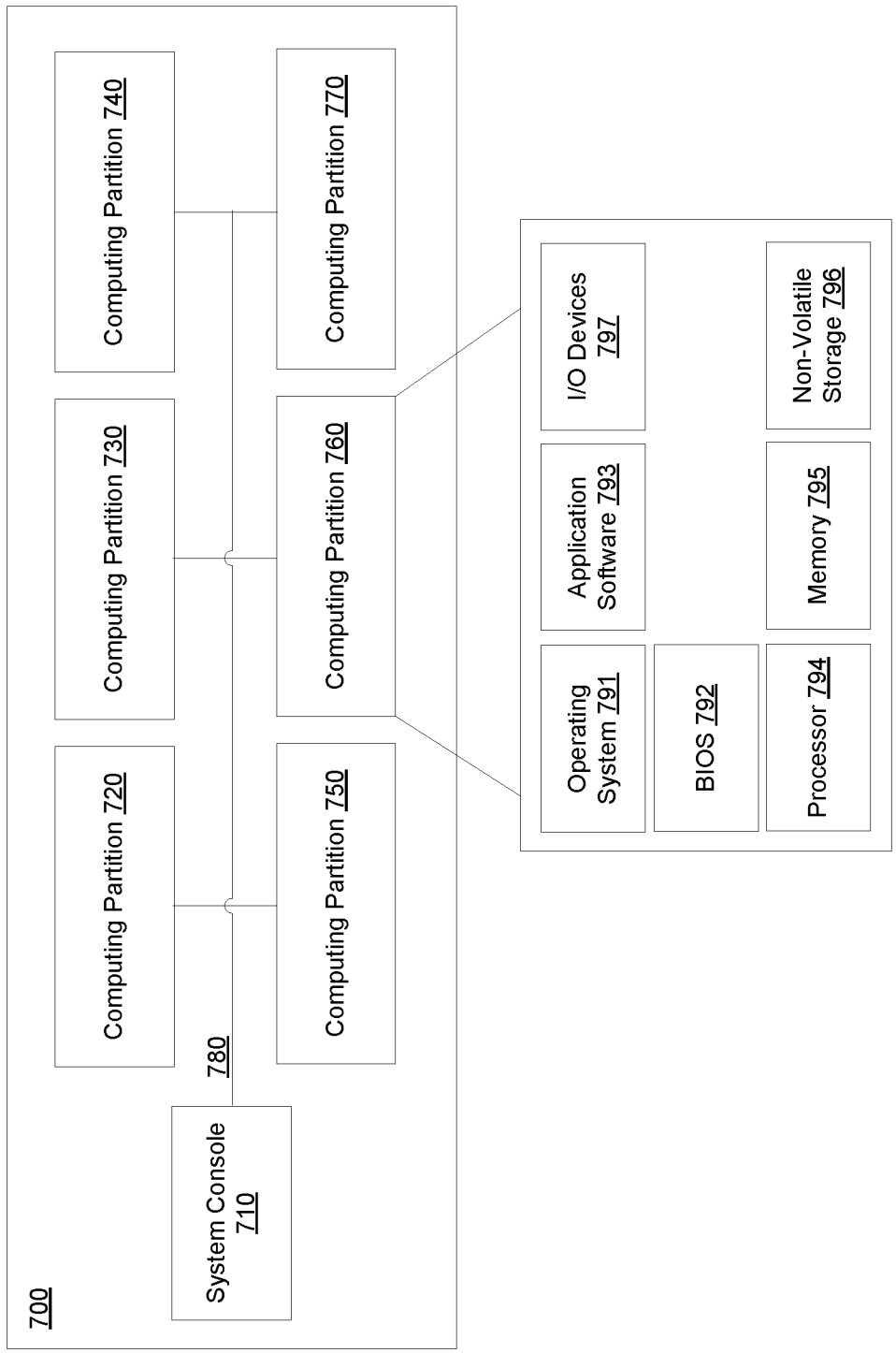
FIG. 7 is a logical view of an exemplary high-performance computing system, in accordance with embodiments of the application.

FIG. 7 is a logical view of an exemplary high-performance computing system, in accordance with embodiments of the application. The exemplary high-performance computing system may be used with illustrative embodiments described herein. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 700 includes a number of logical computing partitions 720, 730, 740, 750, 760, 770 for providing computational resources, and a system console 710 for managing the plurality of partitions 720-770. A "computing partition" (or "partition") in an HPC system is an administrative allocation of computational resources that runs a single operating system instance and has a common memory address space. Partitions 720-770 may communicate with the system console 710 using a logical communication network 780. A system user, such as a scientist or engineer who desires to perform a calculation, may request computational resources from a system operator, who uses the system console 710 to allocate and manage those resources. Allocation of computational resources to partitions is described below. The HPC system 700 may have any number of computing partitions that are administratively assigned as described in more detail below, and often has only one partition that encompasses all of the available computing resources. Accordingly, this figure should not be seen as limiting the scope of the invention.

Each computing partition, such as partition 760, may be viewed logically as if it were a single computing device, akin to a desktop computer. Thus, the partition 760 may execute software, including a single operating system ("OS") instance 791 that uses a basic input/output system ("BIOS") 792 as these are used together in the art, and application software 793 for one or more system users.

Accordingly, as also shown in FIG. 7, a computing partition has various hardware allocated to it by a system operator, including one or more processors 794, volatile memory 795, non-volatile storage 796, and input and output ("I/O") devices 797 (e.g., network ports, video display devices, keyboards, and the like). However, in HPC systems like the embodiment in FIG. 7, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system design to support high-performance computing.

As part of its system management role, the system console 710 acts as an interface between the computing capabilities of the computing partitions 720-770 and the system operator or other computing systems. To that end, the system console 710 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 700.

Additional details of certain exemplary HPC systems can be found in U.S. Pat. No. 9,237,093 entitled BANDWIDTH ON-DEMAND ADAPTIVE ROUTING, which is hereby incorporated herein by reference in its entirety.

Figure 8:
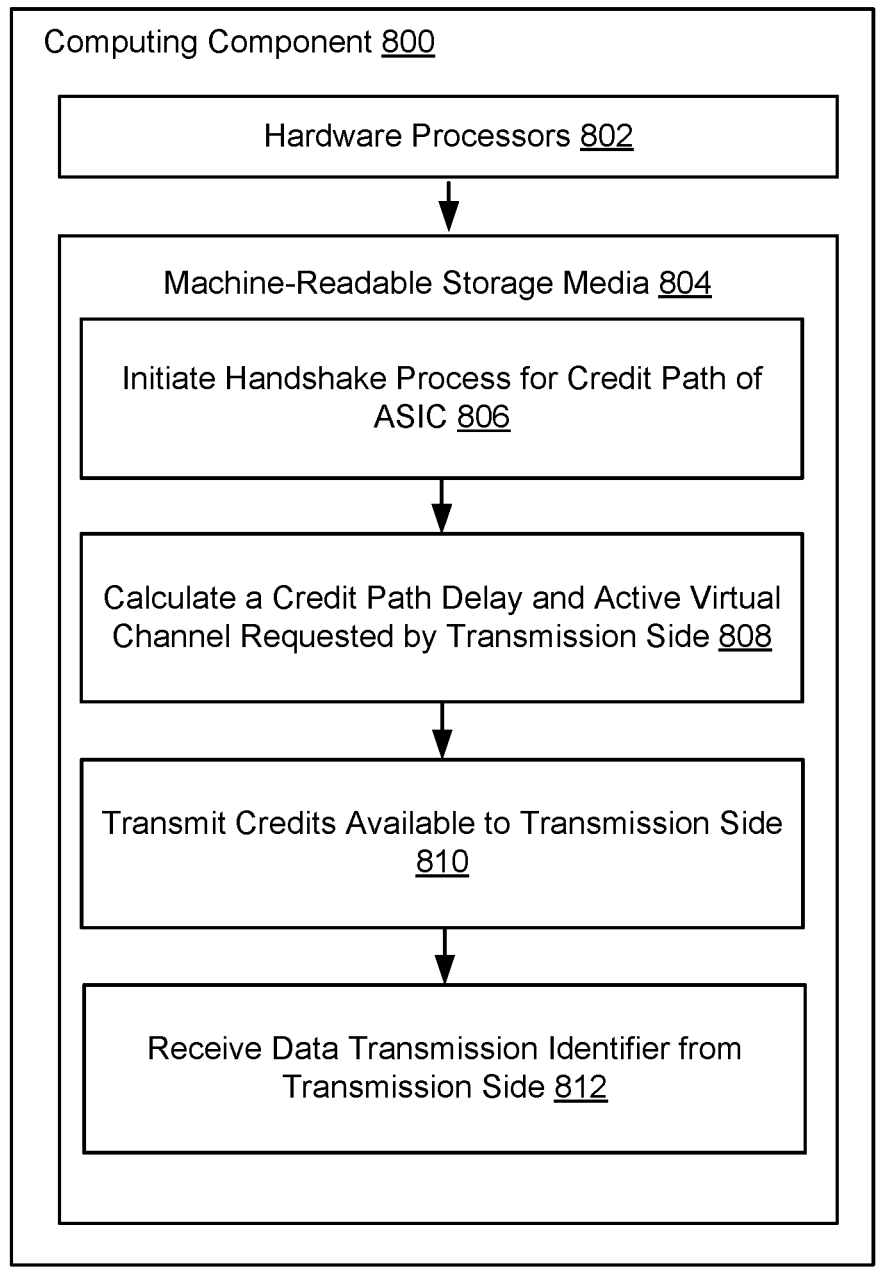
FIG. 8 illustrates a computing component for establishing a credit-based arbitration scheme, in accordance with embodiments of the application.

FIG. 8 illustrates an example iterative process performed by a computing component 800 for providing a key based API neutralizer. Computing component 800 may be, for example, a server computer, a controller, or any other similar computing component capable of processing data. In the example implementation of FIG. 8, the computing component 800 includes a hardware processor 802, and machine-readable storage medium 804. In some embodiments, computing component 800 may be an embodiment of a system incorporating integrated circuit 100 of FIG. 1.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-812, to control processes or operations for optimizing the system during run-time. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-812.

Hardware processor 802 may execute instruction 806 to initiate a handshake process for a credit path of an integrated circuit.

Hardware processor 802 may execute instruction 808 to calculate a credit path delay and active virtual channel requested by a transmission side.

Hardware processor 802 may execute instruction 810 to transmit credits available to the transmission side.

Hardware processor 802 may execute instruction 812 to receive a data transmission identifier from the transmission side.

Figure 9:
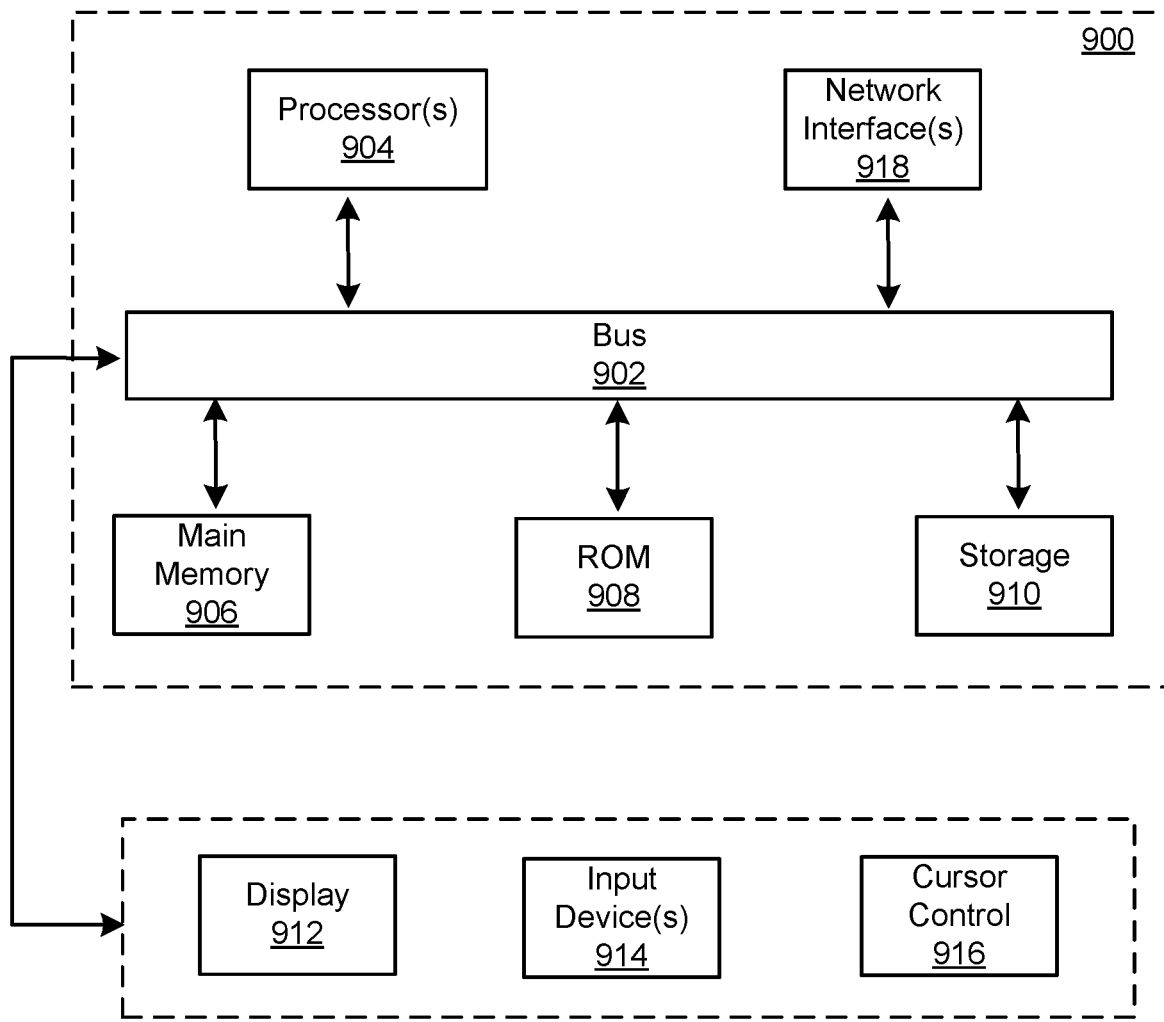
FIG. 9 is an example computing component that may be used to implement various features of embodiments described in the present disclosure.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   initiating a handshake process for a credit-based data path between a transmitting side and a receiving side;
   determining, by the receiving side, a round-trip delay of the credit-based data path and a count of active virtual channels along the credit-based data path;
   allocating, by the receiving side, credits to active virtual channels based in part on the round-trip delay and the count of active virtual channels;
   transmitting, by the receiving side, the allocated credits to the transmission side;
   initiating data transmission over a virtual channel responsive to the transmitting side receiving the allocated credits associated with the virtual channel; and
   maintaining a continuous data flow over the data path by sending additional credits to the transmitting side responsive to credits being freed at the receiving side.

2. The method of claim 1, wherein the allocated credits comprise virtual-channel-specific credits and shared credits.

3. The method of claim 2, further comprising:
   determining, by the receiving side, based on the count of active virtual channels, one or more unused virtual channels; and
   adding virtual-channel-specific credits associated with the unused virtual channels to a shared credit pool.

4. The method of claim 1, further comprising:
   receiving, by the receiving side, a reset signal; and
   initiating a reset process to reset credit counters at the transmitting side.

5. The method of claim 1, wherein the data transmitted over the virtual channel comprises a header, a tail, and an error indicator.

6. The method of claim 1, wherein the data path comprises three or six interleaved virtual channels.

7. The method of claim 1, further comprising:
   determining that a dedicated credit pool for a respective virtual channel is full; and
   adding additional credits received on the respective virtual channel to a shared credit pool.

8. A computer system, comprising:
   a memory; and
   one or more processors to execute instructions stored in the memory to perform a method, the method comprising:
      initiating a handshake process for a credit-based data path between a transmitting side and a receiving side;
      determining, by the receiving side, a round-trip delay of the credit-based data path and a count of active virtual channels along the credit-based data path;
      allocating, by the receiving side, credits to active virtual channels based in part on the round-trip delay and the count of active virtual channels;
      transmitting, by the receiving side, the allocated credits to the transmission side;
      initiating data transmission over a virtual channel responsive to the transmitting side receiving the allocated credits associated with the virtual channel;
      determining that a dedicated credit pool for a respective virtual channel is full; and
      adding additional credits received on the respective virtual channel to a shared credit pool.

9. The computer system of claim 8, wherein the allocated credits comprise virtual-channel-specific credits and shared credits.

10. The computer system of claim 8, wherein the method further comprises:
- determining, by the receiving side, based on the count of active virtual channels, one or more unused virtual channels; and
- adding virtual-channel-specific credits associated with the unused virtual channels to the shared credit pool.

11. The computer system of claim 8, wherein the method further comprises:
- receiving, by the receiving side, a reset signal; and
- initiating a reset process to reset credit counters at the transmitting side.

12. The computer system of claim 8, wherein the data transmitted over the virtual channel comprises a header, a tail, and an error indicator.

13. The computer system of claim 8, wherein the data path comprises three or six interleaved virtual channels.

14. The computer system of claim 8, wherein the method further comprises:
- maintaining a continuous data flow over the virtual channel by sending additional credits to the transmitting side responsive to credits being freed at the receiving side.

15. A non-transitory computer-readable storage medium storing a plurality of instructions executable by one or more processors, the comprising:
- initiating a handshake process for a credit-based data path between a transmitting side;
- determining, by the receiving side, a round-trip delay of the credit-based data path and a count of active virtual channels along the credit-based data path;
- allocating, by the receiving side, credits to active virtual channels based in part on the round-trip delay and the count of active virtual channels wherein the allocated credits comprise virtual-channel-specific credits and shared credits;
- transmitting, by the receiving side, the allocated credits to the transmission side;
- initiating data transmission over a virtual channel responsive to the transmitting side receiving the allocated credits associated with the virtual channel;
- determining, by the receiving side, based on the count of active virtual channels, one or more unused virtual channels; and
- adding virtual-channel-specific credits associated with the unused virtual channels to a shared credit pool.

16. The non-transitory computer-readable storage medium of claim 15, wherein the instructions further comprise:
- receiving, by the receiving side, a reset signal; and
- initiating a reset process to reset credit counters at the transmitting side.

17. The non-transitory computer-readable storage medium of claim 15, wherein the instructions further comprise:
- maintaining a continuous data flow over the data path by sending additional credits to the transmitting side responsive to credits being freed at the receiving side.

18. The non-transitory computer-readable storage medium of claim 15, wherein the instructions further comprise:
- determining that a dedicated credit pool for a respective virtual channel is full; and
- adding additional credits received on the respective virtual channel to a shared credit pool.

19. The non-transitory computer-readable storage medium of claim 15, wherein the data path comprises three or six interleaved virtual channels.

20. The non-transitory computer-readable storage medium of claim 15, wherein the data transmitted over the virtual channel comprises a header, a tail, and an error indicator.

* * * * *